United States Patent
Tao et al.

(10) Patent No.: US 10,197,421 B2
(45) Date of Patent: Feb. 5, 2019

(54) CAMERA, POSTURE CHANGE DETECTION AND POSTURE RESTORATION THEREOF

(71) Applicant: ZHEJIANG UNIVIEW TECHNOLOGIES CO., LTD, Hangzhou (CN)

(72) Inventors: Yong Tao, Hangzhou (CN); Bujun Que, Hangzhou (CN); Yifei Sun, Hangzhou (CN)

(73) Assignee: Zhejiang Uniview Technologies Co., Ltd, Hangzhou (CN)

( * ) Notice: Subject to any disclaimer, the term of this patent is extended or adjusted under 35 U.S.C. 154(b) by 368 days.

(21) Appl. No.: 15/051,590

(22) Filed: Feb. 23, 2016

(65) Prior Publication Data
US 2016/0255274 A1    Sep. 1, 2016

(30) Foreign Application Priority Data

Feb. 27, 2015 (CN) .......................... 2015 1 0090171
Feb. 27, 2015 (CN) ...................... 2015 2 0118159 U

(51) Int. Cl.
G01D 5/36 (2006.01)
G02B 7/04 (2006.01)
G03B 3/12 (2006.01)

(52) U.S. Cl.
CPC ............... *G01D 5/366* (2013.01); *G02B 7/04* (2013.01); *G03B 3/12* (2013.01)

(58) Field of Classification Search
CPC .......... H04N 5/23212; H04N 5/23296; H04N 5/225; H04N 5/2252; H05K 7/00–7/2099

(Continued)

(56) References Cited

U.S. PATENT DOCUMENTS

2001/0025920 A1* 10/2001 Ueda .................. G01D 5/34715
250/231.13
2004/0057723 A1* 3/2004 Uenaka .................... G03B 1/00
396/661

(Continued)

FOREIGN PATENT DOCUMENTS

CN    101241220 A    8/2008
CN    102929073 A    2/2013

(Continued)

OTHER PUBLICATIONS

State Intellectual Property Office of the People's Republic of China, Office Action and Search Report Issued in Application No. 201510090171.2, dated Apr. 26, 2017, 20 pages. (Submitted with Partial Translation).

*Primary Examiner* — Xi Wang
(74) *Attorney, Agent, or Firm* — McCoy Russell LLP

(57) ABSTRACT

A device for detecting posture change of a operation part in a camera and a method for restoring posture are disclosed. The device may include a photo interrupter and a photoelectric baffle structure including a plurality of baffle pieces fixed on a base. The baffle pieces may include a first baffle piece and remaining second baffle pieces of a length specification different from that of the first baffle piece, and there is a gap between two adjacent baffle pieces. An output signal from the photo interrupter changes according to the aligning relationship between the photo interrupter and the baffle pieces. One of the photoelectric baffle structure and the photo interrupter may follow the motion of an operation part of the camera while the other one remains unmoved, so that a posture change of the operation part may be detected based on the output signal from the photo interrupter.

13 Claims, 7 Drawing Sheets

(58) Field of Classification Search
USPC ....... 359/573; 427/164; 348/373–376, 222.1;
396/144, 315, 84
See application file for complete search history.

(56) References Cited

U.S. PATENT DOCUMENTS

| | | | |
|---|---|---|---|
| 2011/0069390 A1* | 3/2011 | Yoshida | G01D 5/3473 |
| | | | 359/573 |
| 2011/0199074 A1* | 8/2011 | Kang | G01B 7/30 |
| | | | 324/207.25 |
| 2013/0148212 A1 | 6/2013 | Okawa et al. | |
| 2015/0022911 A1 | 1/2015 | Yoshimuta | |
| 2015/0350528 A1* | 12/2015 | Ohtani | H04N 5/2254 |
| | | | 348/347 |

FOREIGN PATENT DOCUMENTS

| | | |
|---|---|---|
| CN | 104300847 A | 1/2015 |
| JP | H0638083 A | 2/1994 |

\* cited by examiner

CAMERA, POSTURE CHANGE DETECTION AND POSTURE RESTORATION THEREOF

CROSS-REFERENCE TO RELATED APPLICATIONS

The present application claims priority to Chinese Patent Application No. 201510090171.2, filed on Feb. 27, 2015, and Chinese Patent Application No. 201520118159.3, filed on Feb. 27, 2015, the entire contents of both of which are hereby incorporated by reference for all purposes.

BACKGROUND

The disclosure relates to a camera, particularly relates to a device for detecting posture change of a camera and a posture restoration for the camera.

A user may direct a camera towards a specific monitoring position by rotating an operation part of the camera. However, the operation part also may be rotated due to shake or other reasons such that the camera cannot achieve expected monitoring, which degrades user experience for the camera.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1A:
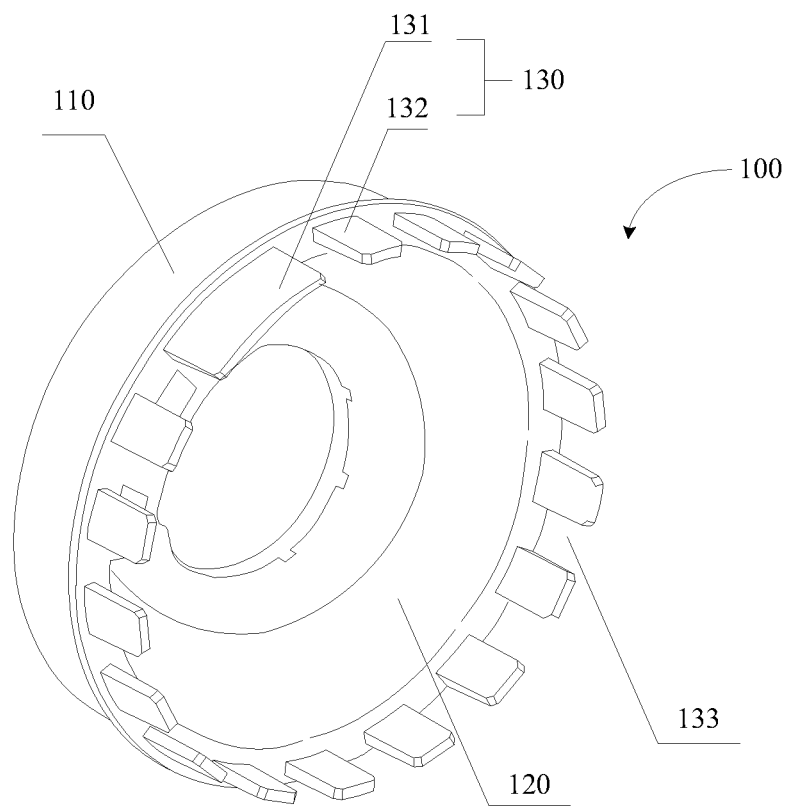
FIG. 1A is a perspective view schematically showing a photoelectric baffle structure of a device for detecting posture change according to an example of the disclosure.
Figure 1B:
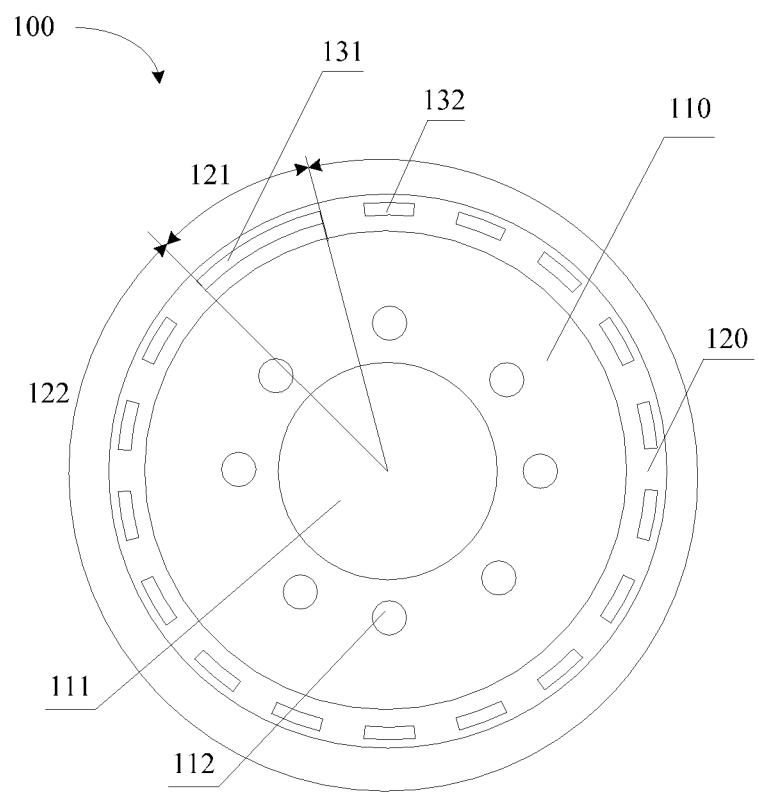
FIG. 1B is a top view of the photoelectric baffle structure illustrated in FIG. 1A.
Figure 1C:
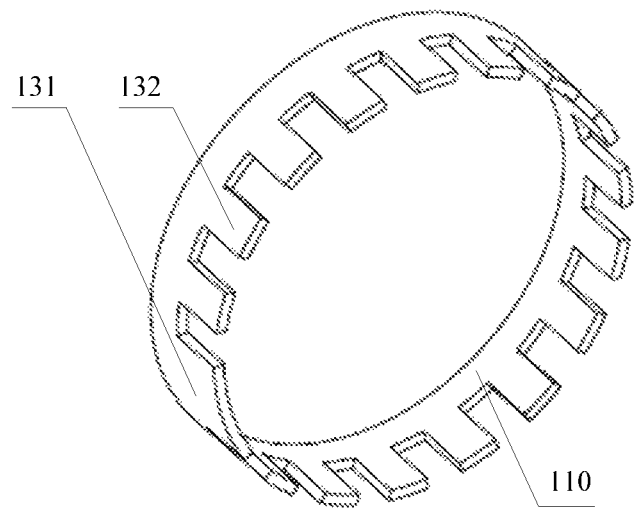
FIG. 1C is a perspective view schematically showing an photoelectric baffle structure of a device for detecting posture change according to another example of the disclosure.

FIG. 1A is a perspective view schematically showing a photoelectric baffle structure of a device for detecting posture change according to an example of the disclosure. FIG. 1B is a top view of the photoelectric baffle structure illustrated in FIG. 1A. As illustrated in FIG. 1A and FIG. 1B, a photoelectric baffle structure 100 may include a base 110, a first cylinder 120 and a plurality of baffle pieces 130. One end of the first cylinder 120 is fixed on a side end surface of the base 110. The plurality of baffle pieces 130 are fixed on an annular end surface of the other end of the first cylinder 120, and there is a gap 133 between every two adjacent baffle pieces 130. According to another example, the plurality of baffle pieces 130 may be directly fixed on the base 110, as illustrated in FIG. 1C.

The plurality of baffle pieces 130 may include a first baffle piece 131 and second baffle pieces 132. Further, as illustrated in FIG. 1B, the base 110 may be provided thereon with a central hole 111 and a plurality of mounting holes 112 which are evenly arranged circumferentially with respect to the central hole 111. The photoelectric baffle structure 100 may be mounted to a camera through the mounting holes 112.

Figure 2:
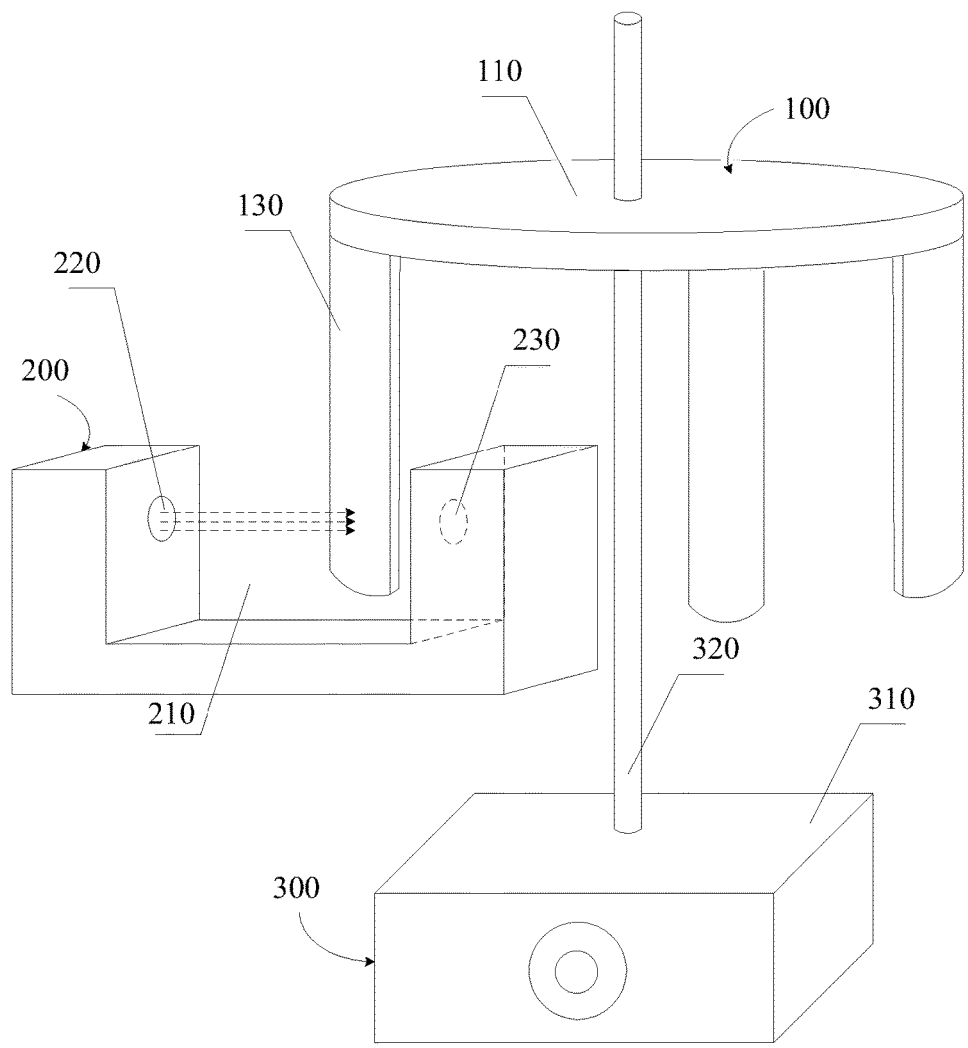
FIG. 2 schematically shows the structural relationship between a photoelectric baffle structure and a photo interrupter of a device for detecting posture change, and an operation part of a camera according to an example of the disclosure.
Figure 3:
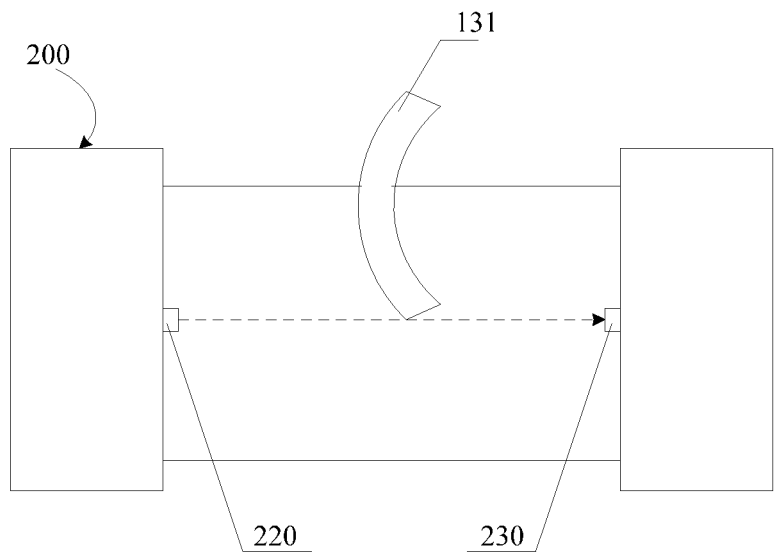
FIG. 3 schematically shows that the operation part of the camera is in an initial posture according to an example of the disclosure.

As illustrated in FIG. 2 and FIG. 3, the device for detecting posture change may further include a photo interrupter 200. When the device is mounted to the camera, one of the photoelectric baffle structure 100 and the photo interrupter 200 may follow the motion of an operation part 300 of the camera while the other may remain unmoved. The "operation part 300" may be explained as a functional component of the camera for the rotation of a lens. For example, the operation part 300 may be a lens 310 or a stepping motor (not shown) which may drive the lens 310 to rotate horizontally by using a vertical rotation axis 320, and so on.

Referring to FIG. 2, the "follow the motion of the operation part 300 of the camera" may be understood as: the photoelectric baffle structure 100 may rotate simultaneously, by the same angle, and in the same direction as the operation part 300, and thus, they both may remain stationary relative to each other. For example, when the lens 310 is driven to rotate horizontally by the stepping motor 310, the photoelectric baffle structure 100 may simultaneously rotate by the same angle in the same direction as the lens 310.

Similarly, the "remain unmoved" may be understood as: when the operation part 300 rotates, the absolute position of the photo interrupter 200 may be unchanged. For example, as illustrated in FIG. 2, when the operation part 300 and the photoelectric baffle structure 100 rotate synchronously around the vertical rotation axis 320, the photo interrupter 200 may remain unmoved. Therefore, a relative motion may occur between the photoelectric baffle structure 100 and the photo interrupter 200, so that a posture change of the operation part 300 may be detected based on the change of the output signal from the photo interrupter 200 caused by the relative motion.

In another example, the photo interrupter 200 may follow the motion of the operation part 300 while the photoelectric baffle structure 100 remains unmoved, and its redundant description is omitted here.

As illustrated in FIG. 2, the photo interrupter 200 may be provided thereon with a trench 210 which coordinates with the photoelectric baffle structure 100. One side of the trench 210 corresponds to a light transmitter 220 and the other side corresponds to an optic sensor 230. In order to secure the coordination between the photo interrupter 200 and the baffle pieces 130 on the photoelectric baffle structure 100, the cross section projection of each baffle piece 130 may be an arc segment, for example, on the annular end surface of the first cylinder 120 or on the base 110, as illustrated in FIG. 3. Thus, it can prevent collision or friction of the baffle pieces 130 with both lateral sides of the trench 210 on the photo interrupter 200 during the motion of the baffle pieces 130. However, the cross section of each baffle piece 130 may be in other shapes besides an arc segment, so long as the baffle piece 130 may enter into the trench 210 to block light transmitted from the light transmitter 220.

When light transmitted from the light transmitter 220 reaches the optic sensor 230, an output signal from the photo interrupter 200 may be of a first level such as a high level. When light transmitted from the light transmitter 220 is blocked by any one of the baffle pieces 130 on the photoelectric baffle structure 100 and cannot reach the optic sensor 230, the output signal from the photo interrupter 200 may be of a second level such as a low level. Thus, when the photoelectric baffle structure 100 rotates along with the operation part 300, the output signal from the photo interrupter 200 may be of the first level or the second level. The level of the output signal from the photo interrupter 200 may change according to the aligning relationship between the photo interrupter 200 and the baffle pieces on the photoelectric baffle structure 100.

According to another example, besides the level of the output signal, it may adopt other attributes of the output signal such as frequency, which may change according to the aligning relationship between the photo interrupter 200 and the baffle pieces on the photoelectric baffle structure 100.

In this way, when the output signal from the photo interrupter 200 is changed, it indicates that the aligning relationship between the photo interrupter 200 and the baffle pieces on the photoelectric baffle structure 100 may have changed. Thus, the posture of the operation part 300 may be viewed to have changed. The posture change may be due to control of the user, or due to an unexpected external force. For example, the posture of the operation part of the camera may be changed when the mounting rack of the camera gets hit accidentally.

By provision of a plurality of baffle pieces 130 on the photoelectric baffle structure 100, it may detect whether the posture of the operation part 300 of the camera has changed according to change of the output signal from the photo interrupter 200. And when determining the posture change of the operation part 300 is not caused by the user's instructions, a posture restoration operation described hereinafter may be performed to eliminate the impact from an unexpected external force on the monitoring of the camera as possible.

To facilitate determining and controlling the posture of the operation part 300, an initial posture may be pre-defined, such as in which the lens of the camera is directed toward the right front direction. And each posture of the operation part 300 may be recorded as a relative positional relationship with respect to the initial posture. Therefore, by setting the baffle pieces 130 on the photoelectric baffle structure 100 to have different specifications, for example, a baffle piece 131 which corresponds to the initial posture has a first length specification, and remaining baffle pieces 132 all have a second length specification, it may determine the initial posture by searching for the first baffle piece 131. For example, as illustrated in FIG. 3, when the photo interrupter 200 is aligned with the edge of one side of the first baffle piece 131, the operation part 300 can be viewed as in the initial posture.

As illustrated in FIG. 1B, the first baffle piece 131 has a downward projection length longer than that of the second baffle piece 132. However, the downward projection length of the first baffle piece 131 may also be shorter than that of the second baffle piece 132, as long as there is difference in length specification between the first baffle piece 131 and the second baffle piece 132.

Further, the detection precision for relative motion between the photo interrupter 200 and the photoelectric baffle structure 100 may be improved by increasing the number or density of the second baffle pieces 132, so that the detection precision for posture change of the operation part of the camera can be improved. Further, all the second baffle pieces 132 may be arranged evenly so as to ensure that the detection precision is the same or similar no matter when the operation part 300 rotates to have any posture. For example, as illustrated in FIG. 1B, suppose that the first baffle piece 131 corresponds to a first arc segment 121 of the annular end surface, and all the second baffle pieces 132 correspond to remaining second arc segments 122, all the second baffle pieces 132 may be arranged corresponding to the second arc segments 122 in an equal space from each other.

According to an example, the gap between every two adjacent baffle pieces may have the same length specification as that of the second baffle piece 132. In this case, since the gap between every two adjacent baffle pieces is equal in length specification to the second baffle piece 132, manufacturing of the photoelectric baffle structure 100 may be easy and the calculation complexity in position detection based on the photoelectric baffle structure 100 may be also simplified.

According to one aspect of the disclosure, a camera is provided which may include an operation part and the above-described device for detecting posture change. When the operation part rotates around a vertical rotation axis or a horizontal rotation axis, one of a photoelectric baffle structure and a photo interrupter of the device for detecting posture change may follow the motion of the operation part while the other one may remain unmoved. Thus, a relative motion may occur between the photo interrupter and the photoelectric baffle structure, so that the posture of the operation part can be detected according to the aligning relationship between the photo interrupter and the baffle pieces on the photoelectric baffle structure.

According to another example, the camera may include an operation part and two devices for detecting posture change. When the operation part rotates around a vertical rotation axis, one of a photoelectric baffle structure and a photo interrupter of the first device for detecting posture change may follow the motion of the operation part while the other one may remain unmoved. Thus, a relative motion may occur between the photo interrupter and the photoelectric baffle structure of the first device, so that posture change of the operation part in the horizontal plane may be detected according to the aligning relationship between the photo interrupter and the baffle pieces on the photoelectric baffle structure of the first device. When the operation part rotates around a horizontal rotation axis, one of a photoelectric baffle structure and a photo interrupter of the second device for detecting posture change may follow the motion of the operation part while the other one may remain unmoved. Thus a relative motion may occur between the photo interrupter and the photoelectric baffle structure of the second device, so that posture change of the operation part in the vertical plane can be detected according to the aligning relationship between the photo interrupter and the baffle pieces on the photoelectric baffle structure of the second device.

Figure 5:
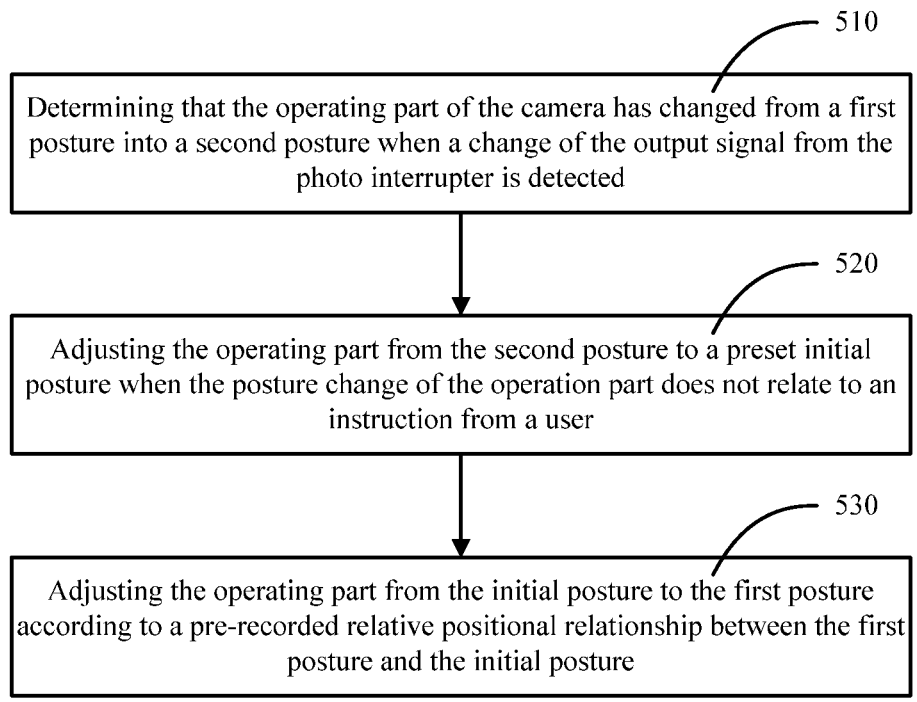
FIG. 5 illustrates a flowchart for a method for restoring posture of an operation part in a camera according to an example of the disclosure.

FIG. 5 illustrates a flowchart for a method for restoring posture of an operation part in a camera according to an example of the disclosure. As illustrated in FIG. 5, the method may include the following blocks 510~530.

At block 510, it may determine that the operation part of the camera has changed from a first posture into a second posture when a change of an output signal from the photo interrupter in the camera is detected.

As describe above, the output signal from the photo interrupter may be set as a detection condition for detecting posture change of the operation part, and further determination may be made on whether the posture change occurs in response to the user's instruction. If the posture change is determined not to occur in response to the user's instruction, the camera may be determined to have an undesired posture change influencing the camera monitoring.

At block 520, the operation part of the camera may be adjusted from the second posture into a preset initial posture when the posture change of the operation part does not relate to the user's instruction. In the initial posture, the photo interrupter may be aligned with the edge at one side of the first baffle piece on the photoelectric baffle structure.

According to the implementation of the photoelectric baffle structure, the operation part of the camera may be adjusted into the initial posture in various ways.

Figure 6:
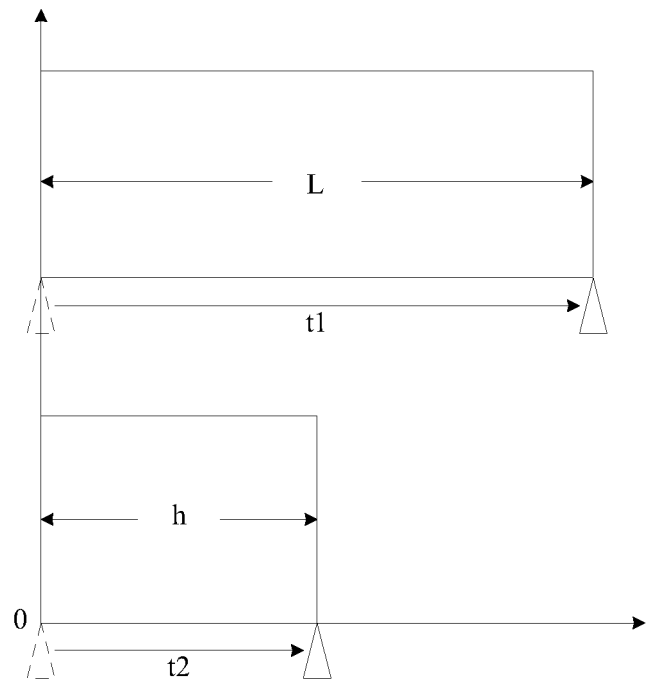
FIG. 6 is a schematic view showing output signals from a photo interrupter when the photo interrupter is aligned with baffle pieces having different length specifications on a photoelectric baffle structure of a device for detecting posture change according to an example of the disclosure.

According to an example, suppose that an arc segment corresponding to the first baffle piece on the photoelectric baffle structure may have a length L and an arc segment corresponding to the second baffle piece may have a length h, wherein L>h. If the photo interrupter rotates at a constant rotation speed with respect to the photoelectric baffle structure under control of the motor, and the blocking time in which the photo interrupter is blocked by the first baffle piece is t1 and the blocking time in which the photo interrupter is blocked by the second baffle piece is t2, it can be ascertained that t1>t2, as illustrated in FIG. 6. In this case, since the photo interrupter may output a signal with a constant level such as a low level signal when blocked by the baffle piece, the length specification of the baffle piece blocking the photo interrupter may be determined according to the lasting time during which the photo interrupter outputs the signal with a constant level every time. For example, if the lasting time matches with the length of the arc segment corresponding to the first baffle piece and the rotation speed of the photoelectric baffle structure with respect to the photo interrupter, i.e., the lasting time t0=arc segment length L/rotation speed v, then it may be determined that it is the first baffle piece which blocks the photo interrupter.

Further, the edge at one side of the first baffle piece may be preset as a zero-point position. For example, when the first baffle piece is found, the photo interrupter may be aligned with the zero-point position by rotation of the photoelectric baffle structure with respect to the photo interrupter, so that the operation part of the camera may be adjusted into the initial posture.

According to another example, suppose that an arc segment corresponding to the first baffle piece on the photoelectric baffle structure has a length L, an arc segment corresponding to the second baffle piece has a length h, and an arc segment corresponding to the interval between the adjacent baffle pieces has a length h, wherein L=2 h. In this case, initialization of the posture may be performed through a method including the following blocks.

At block 521, the photo interrupter may be caused to align with the edge of any baffle piece on the photoelectric baffle structure by rotation of the photoelectric baffle structure with respect to the photo interrupter.

At block 522, the photoelectric baffle structure may be caused to rotate by a distance h/2 in a preset direction with respect to the photo interrupter.

At block 523, the photoelectric baffle structure may be caused to rotate by a distance h in the preset direction with respect to the photo interrupter, and it may be determined whether the output signal from the photo interrupter has changed during the rotation.

If the output signal from the photo interrupter has not changed during the time in which the photoelectric baffle structure rotates by a distance h relative to the photo interrupter, it may indicate that the photo interrupter 2 has aligned with the first baffle piece 131 on the photoelectric baffle structure 1. At this time, the photo interrupter 2 may be caused to align with the zero-point position which is the edge at one side of the first baffle piece 131 by rotation of the photoelectric baffle structure 1 with respect to the photo interrupter 2, so that the operation part 3 of the camera may be adjusted into the initial posture.

If the output signal from the photo interrupter has any change, the process may return and repeat block 323 until the first baffle piece 131 is found.

At block 524, the photo interrupter 2 may be caused to align with the zero-point position which is the edge at one side of the first baffle piece 131 by rotation of the photoelectric baffle structure 1 with respect to the photo interrupter 2.

Figure 7:
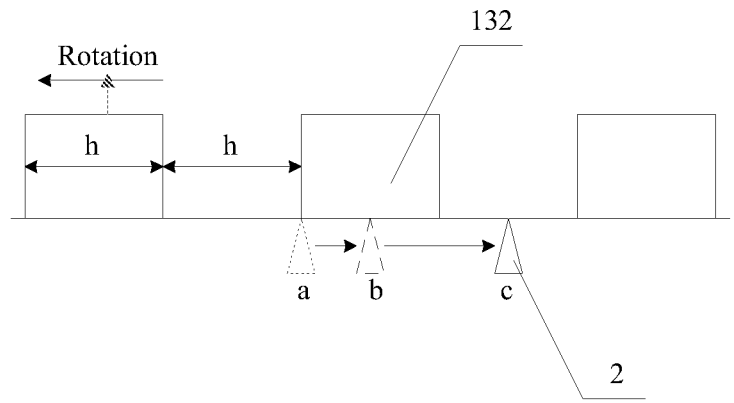
FIG. 7 schematically illustrates an aligning relationship between a photo interrupter and baffle pieces on a photoelectric baffle structure of a device for detecting posture change according to an example of the disclosure.

For example, as illustrated in FIG. 7, in block 521, the photo interrupter 2 may be aligned with the left side (illustrated as position a) of the second baffle piece 132. Then, suppose that the photoelectric baffle structure 1 moves leftwards relative to the photo interrupter 2, after block 522, the photo interrupter 2 may be aligned with the central position (illustrated as position b in FIG. 7) of the second baffle piece 132. Then, after block 523, the photo interrupter 2 may be aligned with the central position (illustrated as position c in FIG. 7) of the gap 133 on the right side of the second baffle piece 132, during which the output signal from the photo interrupter 2 has changed from a low level into a high level.

Figure 8:
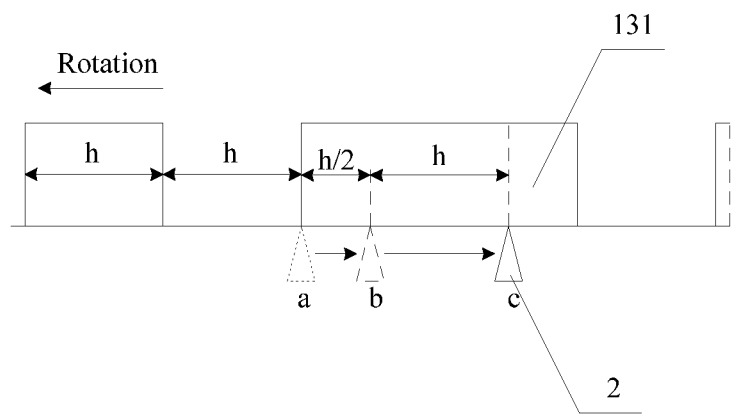
FIG. 8 is a schematic view showing an aligning relationship between a photo interrupter and baffle pieces on a photoelectric baffle structure of a device for detecting posture change according to another example of the disclosure.

As another example, as illustrated in FIG. 8, in block 521, the photo interrupter 2 may be aligned with the left side (illustrated as position a in FIG. 8) of the first baffle piece 131. Then, suppose that the photoelectric baffle structure 1 moves leftwards relative to the photo interrupter 2, after block 522, the photo interrupter 2 may be aligned with a position (illustrated as position b in FIG. 8) having a distance h/2 from the left side of the first baffle piece 131. Then, after block 523, the photo interrupter 2 may be aligned with a position (illustrated as position c in FIG. 8) having a distance 1.5 h from the left side of the first baffle piece 131, during which the output signal from the photo interrupter 2 remains unchanged, that is, to maintain a low level.

Figure 9:
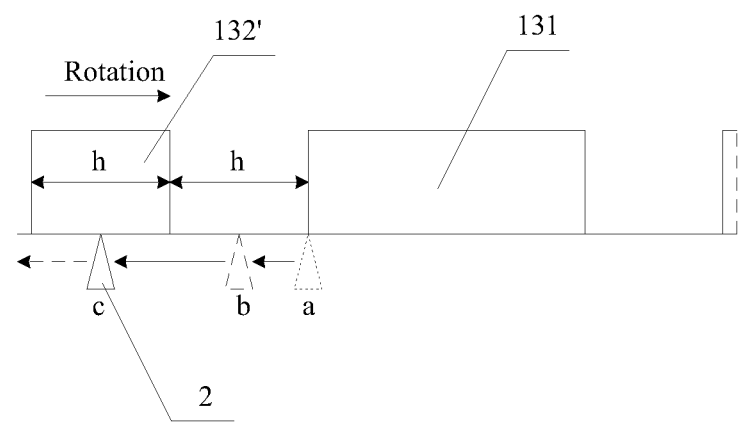
FIG. 9 is a schematic view showing an aligning relationship between a photo interrupter and baffle pieces on a photoelectric baffle structure of a device for detecting posture change according to yet another example of the disclosure.

As yet another example, as illustrated in FIG. 9, in block 521, the photo interrupter 2 may be aligned with the left side (illustrated as position a) of the first baffle piece 131 (or the second baffle piece 132). Then suppose that the photoelectric baffle structure 1 moves rightwards relative to the photo interrupter 2, after block 522, the photo interrupter 2 may be aligned with the central position(illustrated as position b) of the gap 133 on the left side of the first baffle piece 131. Then, after block 523, the photo interrupter 2 may be aligned with the central position (illustrated as position c) of the second baffle piece 132' on the left side of the gap 133, during which the output signal from the photo interrupter 2 has changed from a high level into a low level.

At block 530, the operation part may be adjusted from the initial posture into the first posture according to a pre-recorded relative positional relationship between the first posture and the initial posture.

In this example, the relative positional relationship may be stored into the local storage space of the camera or cloud storage, wherein the relative positional relationship may include the rotation direction and the rotation angle between the first posture and the initial posture, such as "rotate by 32° clockwise in a horizontal direction".

Figure 4:
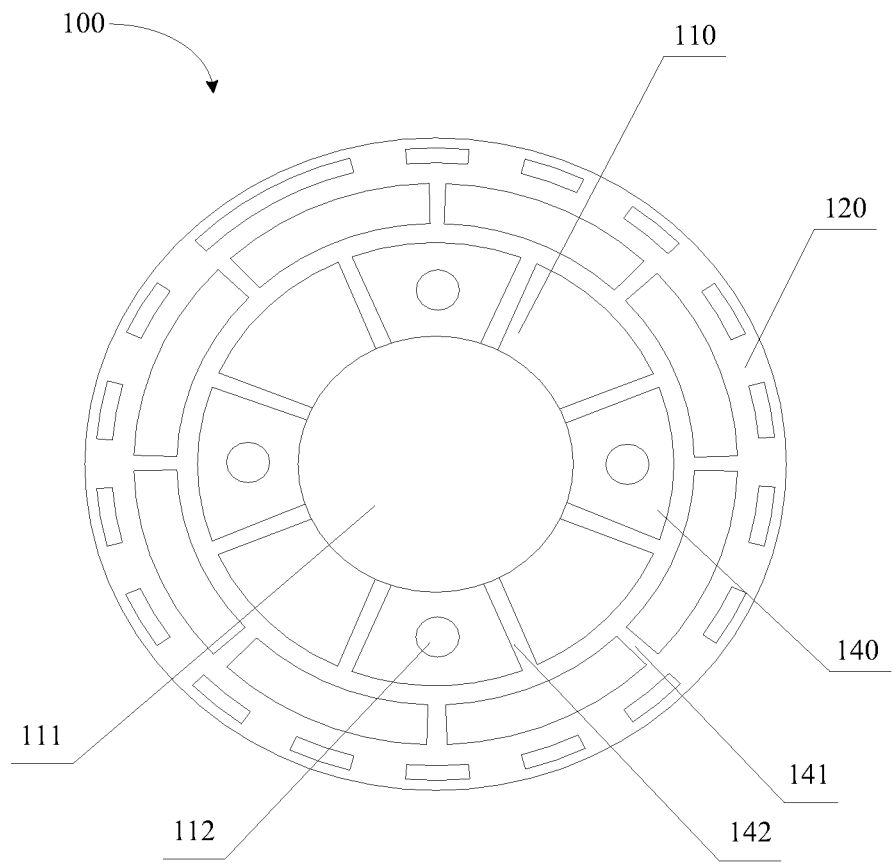
FIG. 4 is a plan view schematically showing a photoelectric baffle structure of a device for detecting posture change according to an example of the disclosure.

Further, as illustrated in FIG. 4, the photoelectric baffle structure 100 may also include a second cylinder 140. One end of the second cylinder 140 may be fixed on one side end surface of the base 110. The second cylinder 140 may be positioned inside the first cylinder 120. There may be an annular gap between the outer wall of the second cylinder 140 and the inner wall of the first cylinder 120 to facilitate electrical connection between components. The outer wall of the second cylinder 140 and the inner wall of the first cylinder 120 may be connected though a plurality of reinforcing ribs 141 which are evenly arranged circumferentially in the annular gap, so as to reinforce the mechanical connection between the second cylinder 140 and the first cylinder 120. Further, the inner wall of the second cylinder 140 and the inner end surface of the base 110 may be connected through a plurality of ribbed plates 142 which are evenly arranged circumferentially, so as to reinforce the mechanical connection between the second cylinder 140 and the base.

Figure 10:
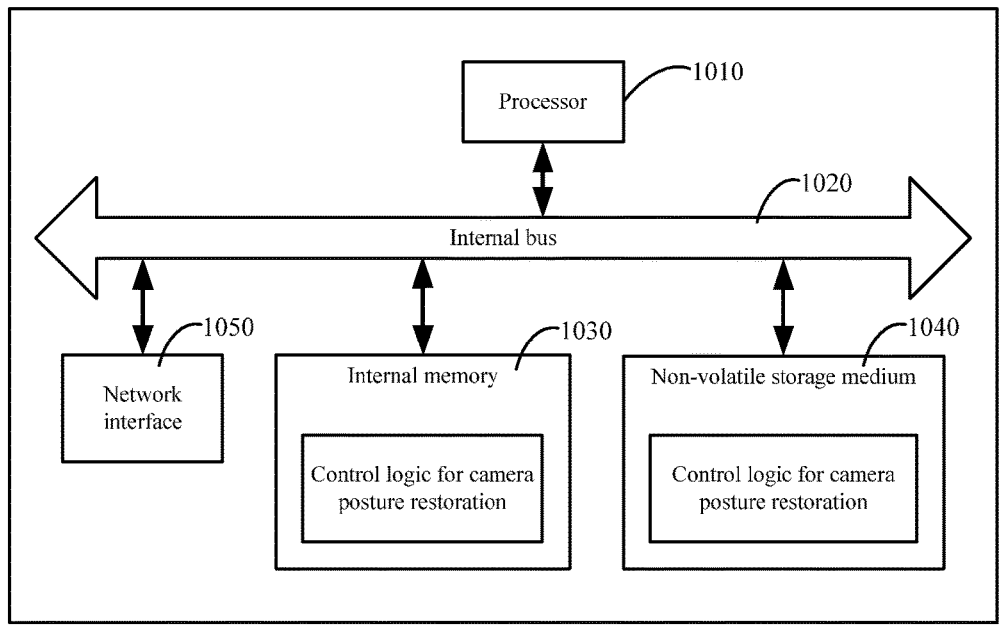
FIG. 10 schematically illustrates a hardware structure of a device for restoring posture of an operation part in a camera according to an example of the disclosure.

FIG. 10 schematically illustrates a hardware structure of a device for restoring posture of an operation part in a camera according to an example of the disclosure. Referring to FIG. 10, in the aspect of hardware, the device may include a processor 1010, an internal bus 1020, a network interface 1050, an internal memory 1030 and non-volatile storage medium 1040, and may further include other hardware. The processor 1010 may read and execute corresponding machine executable instructions from the non-volatile storage medium 1040 into the internal memory 1030. In the aspect of logic, the machine executable instructions may correspond to control logic for camera posture restoration.

Besides the software implementation, the disclosure may include other implementations such as logic devices or combination of software and hardware, etc. For example, the executing subject in the process illustrated in FIG. 5 may be not limited to the processor 1010 illustrated in FIG. 10 and may be hardware or logic devices.

Figure 11:
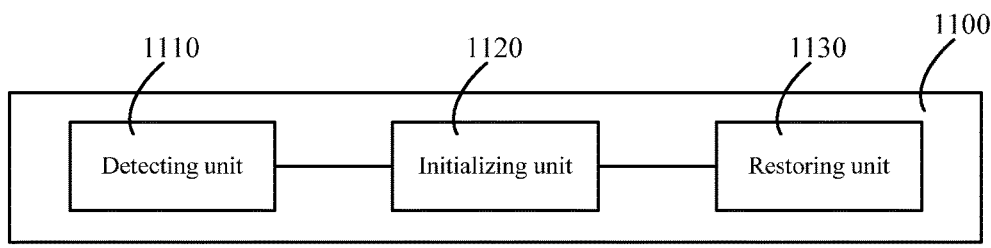
FIG. 11 is a block diagram showing functional blocks of control logic for camera posture restoration according to an example of the disclosure.

Referring to FIG. 11, in software implementation, the control logic 1100 for camera posture restoration may functionally include the following modules.

A detecting unit 1110 may determine that an operation part of the camera has changed from a first posture into a second posture when a change of an output signal from the photo interrupter in the camera is detected.

An initializing unit 1120 may adjust the operation part of the camera from the second posture into a preset initial posture when determining that the posture change of the operation part does not relate to the user's instruction, wherein, when the operation part is in the initial posture, the photo interrupter is aligned with the edge of one side of a first baffle piece on the photoelectric baffle structure.

A restoring unit 1130 may adjust the operation part from the initial posture into the first posture according to a pre-recorded relative positional relationship between the first posture and the initial posture and.

According to an example, the initializing unit 1120 may be used to: control the photoelectric baffle structure to rotate with respect to the photo interrupter at a constant rotation speed; record the lasting time during which the photo interrupter continuously outputs a signal with a constant level; when the lasting time matches with the length of an arc segment corresponding to the first baffle piece and the rotation speed of the photoelectric baffle structure with respect to the photo interrupter, determine that the photo interrupter is aligned with the first baffle piece; and rotate the photoelectric baffle structure with respect to the photo interrupter such that the photo interrupter is aligned with the edge of one side of the first baffle piece.

According to another example, in case that the length of an arc segment corresponding to the second baffle piece on the photoelectric baffle structure is a preset length, the length of the gap between adjacent baffle pieces on the photoelectric baffle structure is the preset length, and the length of an arc segment corresponding to the first baffle piece is twice the preset length, the initializing unit 1120 may be used to: rotate the photoelectric baffle structure with respect to the photo interrupter, so that the photo interrupter is aligned with an edge of any one of the baffle pieces on the photoelectric baffle structure; rotate the photoelectric baffle structure by a half of the preset length in a preset direction with respect to the photo interrupter; rotate the photoelectric baffle structure by the preset length in a preset direction with respect to the photo interrupter, and determine whether the output signal from the photo interrupter has changed during the rotation of the preset length, and when any change occurs, continue to rotate the photoelectric baffle structure by the preset length in the preset direction with respect to the photo interrupter until the output signal from the photo interrupter does not change during a rotation of the preset length; and when the output signal from the photo interrupter does not change during a rotation of the preset length, determine that the photo interrupter is aligned with the first baffle piece, and rotate the photoelectric baffle structure with respect to the photo interrupter such that the photo interrupter is aligned with the edge of one side of the first baffle piece.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A device for detecting posture change, including:
   a photo interrupter, and
   a photoelectric baffle structure including a base and a plurality of baffle pieces fixed on the base;
   wherein, the plurality of baffle pieces includes a first baffle piece and second baffle pieces other than the first baffle piece, the first baffle piece has a circumferential length specification different from that of the second baffle pieces, and
   wherein, the plurality of baffle pieces is arranged in an equal space from each other, and a gap between every two adjacent baffle pieces of the plurality of baffle pieces has a same circumferential length specification as that of the second baffle pieces, and
   an output signal from the photo interrupter changes according to the aligning relationship between the photo interrupter and the plurality of baffle pieces.

2. The device according to claim 1, wherein, after the device is mounted to a camera, one of the photoelectric baffle structure and the photo interrupter follows the motion of an operation part of the camera while the other one remains unmoved, so that the output signal from the photo interrupter changes according to a posture change of the operation part.

3. The device according to claim 1, wherein,
   the first baffle piece is projected on the base as an arc segment, and
   each of the second baffle pieces is projected on the base as an arc segment.

4. The device according to claim 1, wherein,
   when the photo interrupter is aligned with the gap between two adjacent baffle pieces, the output signal from the photo interrupter is of a first level; and
   when the photo interrupter is aligned with any one of the plurality of baffle pieces, the output signal from the photo interrupter is of a second level.

5. The device according to claim 1, wherein, the photoelectric baffle structure further includes a first cylinder,
   one end of the first cylinder is fixed on one side end surface of the base, and
   the plurality of baffle pieces is fixed on the circular end surface of the other end of the first cylinder.

6. The device according to claim 5, wherein, the photoelectric baffle structure further includes a second cylinder,
   one end of the second cylinder is fixed on the one side end surface of the base, and the inner wall of the second cylinder and the inner end surface of the base are connected by a plurality of ribbed plates evenly arranged circumferentially; and
   the second cylinder is located inside the first cylinder, there is an annular gap between the outer wall of the second cylinder and the inner wall of the first cylinder, and the outer wall of the second cylinder and the inner wall of the first cylinder are connected by a plurality of reinforcing ribs evenly arranged circumferentially in the annular gap.

7. The device according to claim 1, wherein, the base is provided thereon with a central hole and a plurality of mounting holes evenly arranged circumferentially with respect to the central hole.

8. A method for restoring posture of an operation part in a camera,
   wherein, the camera is provided with a device for detecting posture change, and posture change of the operation part is detected by the device for detecting posture change,
   wherein, the device for detecting posture change includes:
      a photo interrupter and a photoelectric baffle structure,
      the photoelectric baffle structure includes a base and a plurality of baffle pieces fixed on the base, the plurality of baffle pieces includes a first baffle piece and second baffle pieces other than the first baffle piece, the first baffle piece has a circumferential length specification different from that of the second baffle pieces, and there is a gap between every two adjacent baffle pieces,
      an output signal from the photo interrupter changes according to the aligning relationship between the photo interrupter and the plurality of baffle pieces,
      one of the photoelectric baffle structure and the photo interrupter follows the motion of the operation part of the camera while the other one remains unmoved, so that the output signal from the photo interrupter changes according to a posture change of the operation part; and wherein, the method comprises:
determining that the operation part has changed from a first posture into a second posture when a change of the output signal from the photo interrupter is detected;
adjusting the operation part from the second posture into a preset initial posture if the posture change of the operation part does not relate to a user instruction, wherein, the photo interrupter is aligned with an edge at one side of the first baffle piece when the operation part is in the preset initial posture; and
adjusting the operation part from the preset initial posture into the first posture according to a pre-recorded relative positional relationship between the first posture and the preset initial posture.

9. The method according to claim 8, wherein, adjusting the operation part from the second posture into the preset initial posture, includes:
controlling the photoelectric baffle structure to rotate with respect to the photo interrupter at a constant rotation speed;
recording a lasting time during which the photo interrupter continuously outputs a signal with a low level;
when the lasting time is equal to the quotient of the length of an arc segment corresponding to the first baffle piece divided by the rotation speed of the photoelectric baffle structure with respect to the photo interrupter, determining that the photo interrupter is aligned with the first baffle piece; and
rotating the photoelectric baffle structure with respect to the photo interrupter such that the photo interrupter is aligned with the edge at the one side of the first baffle piece.

10. The method according to claim 8, wherein, when the length of an arc segment corresponding to the second baffle piece is a preset length, the length of an arc segment corresponding to the gap between two adjacent baffle pieces is the preset length, and the length of an arc segment corresponding to the first baffle piece is twice the preset length, adjusting the operation part from the second posture into the preset initial posture, includes:
rotating the photoelectric baffle structure with respect to the photo interrupter such that the photo interrupter is aligned with an edge of any one of the plurality of baffle pieces on the photoelectric baffle structure;
rotating the photoelectric baffle structure by a half of the preset length in a preset direction with respect to the photo interrupter;
rotating the photoelectric baffle structure by the preset length in the preset direction with respect to the photo interrupter;
when the output signal from the photo interrupter has changed during the rotation of the preset length, continuing to rotate the photoelectric baffle structure by the preset length in the preset direction, until the output signal from the photo interrupter does not change during a rotation of the preset length; and
when the output signal from the photo interrupter does not change during a rotation of the preset length, determining that the photo interrupter is aligned with the first baffle piece, and rotating the photoelectric baffle structure with respect to the photo interrupter such that the photo interrupter is aligned with the edge at the one side of the first baffle structure.

11. A preset restoring device, which is applied to a camera and used for restoring posture of an operation part in the camera,
wherein, the posture restoring device includes:
a processor; and
a non-transitory machine readable storage medium storing machine executable instructions corresponding to control logic for restoring posture of the operation part in the camera,
wherein, the camera is provided with a posture detecting device for detecting posture change, and posture change of the operation part is detected by the posture detecting device,
wherein, the posture detecting device includes:
a photo interrupter and a photoelectric baffle structure,
the photoelectric baffle structure includes a base and a plurality of baffle pieces fixed on the base, the plurality of baffle pieces includes a first baffle piece and second baffle pieces other than the first baffle piece, the first baffle piece has a circumferential length specification different from that of each of the second baffle pieces, and there is a gap between every two adjacent baffle pieces,
an output signal from the photo interrupter changes according to the aligning relationship between the photo interrupter and the plurality of baffle pieces,
one of the photoelectric baffle structure and the photo interrupter follows the motion of the operation part of the camera while the other one remains unmoved, so that the output signal from the photo interrupter changes according to a posture change of the operation part,
wherein, by reading and executing the machine executable instructions corresponding to control logic for restoring posture stored on the non-transitory machine readable storage medium, the processor is caused to:
determine that the operation part has changed from a first posture into a second posture when a change of the output signal from the photo interrupter is detected;
adjust the operation part from the second posture into a preset initial posture if the posture change of the operation part does not relate to a user instruction, wherein, the photo interrupter is aligned with the edge at one side of the first baffle piece when the operation part is in the preset initial posture; and
adjust the operation part from the preset initial posture into the first posture according to a pre-recorded relative positional relationship between the first posture and the preset initial posture.

12. The device according to claim 11, wherein, the machine executable instructions further cause the processor to:
control the photoelectric baffle structure to rotate with respect to the photo interrupter at a constant rotation speed;
record a lasting time during which the photo interrupter continuously outputs a signal with a low level;
when the lasting time is equal to the quotient of the length of an arc segment corresponding to the first baffle structure divided by the rotation speed of the photoelectric baffle structure with respect to the photo interrupter, determine that the photo interrupter is aligned with the first baffle piece; and rotate the photoelectric baffle structure with respect to the photo interrupter such that the photo interrupter is aligned with the edge at the one side of the first baffle piece.

13. The device according to claim 11, wherein, when the length of an arc segment corresponding to the second baffle piece is a preset length, the length of an arc segment corresponding to the gap between two adjacent baffle pieces is the preset length, and the length of an arc segment corresponding to the first baffle piece is twice the preset length, the machine executable instructions further cause the processor to:

rotate the photoelectric baffle structure with respect to the photo interrupter such that the photo interrupter is aligned with an edge of any one of the plurality of baffle pieces on the photoelectric baffle structure;

rotate the photoelectric baffle structure by a half of the preset length in a preset direction with respect to the photo interrupter;

rotate the photoelectric baffle structure by the preset length in the preset direction with respect to the photo interrupter;

when the output signal from the photo interrupter has changed during the rotation of the preset length, continue to rotate the photoelectric baffle structure by the preset length in the preset direction, until the output signal from the photo interrupter does not change during a rotation of the preset length; and when the output signal from the photo interrupter does not change during a rotation of the preset length, determine that the photo interrupter is aligned with the first baffle piece, and rotate the photoelectric baffle structure with respect to the photo interrupter such that the photo interrupter is aligned with the edge at the one side of the first baffle piece.

* * * * *